(12) United States Patent
Wang et al.

(10) Patent No.: US 11,262,472 B2
(45) Date of Patent: Mar. 1, 2022

(54) PROSPECTING METHOD AND INSTRUMENT SYSTEM OF THE THREE-DIMENSIONAL ELECTRICAL RESISTIVITY TOMOGRAPHY BASED ON RANDOM DISTRIBUTION OF ELECTRODES

(71) Applicant: Zhejiang University, Hangzhou (CN)

(72) Inventors: Bangbing Wang, Hangzhou (CN); Jiaxin Wang, Hangzhou (CN); Gang Tian, Hangzhou (CN); Zhanjie Shi, Hangzhou (CN); Wenke Zhao, Hangzhou (CN)

( * ) Notice: Subject to any disclaimer, the term of this patent is extended or adjusted under 35 U.S.C. 154(b) by 34 days.

(21) Appl. No.: 16/857,969

(22) Filed: Apr. 24, 2020

(65) Prior Publication Data

US 2020/0249370 A1    Aug. 6, 2020

Related U.S. Application Data

(63) Continuation of application No. PCT/CN2018/115832, filed on Nov. 16, 2018.

(51) Int. Cl.
  *G01V 3/02*   (2006.01)
  *G01S 19/14*  (2010.01)
  *G01V 3/38*   (2006.01)

(52) U.S. Cl.
  CPC .............. *G01V 3/02* (2013.01); *G01S 19/14* (2013.01); *G01V 3/38* (2013.01)

(58) Field of Classification Search
  CPC .. G01V 3/02; G01V 3/38; G01S 19/14; G01S 13/89; G01S 15/8993; G01S 17/894

(Continued)

(56) References Cited

U.S. PATENT DOCUMENTS 5,495,175 A * 2/1996 Ramirez ................. G01V 3/20
                                                     324/353
5,914,603 A * 6/1999 Daily ...................... G01V 3/02
                                                     324/357

(Continued)

FOREIGN PATENT DOCUMENTS

CN        203930089 U    11/2014
CN        204086568 U     1/2015

(Continued)

OTHER PUBLICATIONS

English Translation of Chapter II proceedings of PCT/CN2018/115832 (Year: 2020).*

(Continued)

*Primary Examiner* — Jermele M Hollington
*Assistant Examiner* — Sean Curtis (57) ABSTRACT

An electrical resistivity tomography prospecting system based on random distribution of electrodes is provided. The system comprises a central console and a plurality of data collection units. The central console and the data collection units are connected via wireless communication. The data collection units comprises a collection station and two electrodes connected via a cable. The electrodes may be randomly arranged based on the grounding condition. The GPS equipped on the electrode may provide the location information of the measurement point. The collection station is controlled by the central console, and may perform in two work modes: current supply measurement or electrical potential measurement. The data collection is parallel. Sequentially selecting one collection unit for current supplying, while the rest of collection units work for potential measurement.

4 Claims, 5 Drawing Sheets

(58) Field of Classification Search
USPC .................................................. 324/354, 357
See application file for complete search history.

(56) References Cited

U.S. PATENT DOCUMENTS

| | | | | | |
|---|---|---|---|---|---|
| 6,147,497 | A * | 11/2000 | Berryman | ................ | G01V 3/24 324/357 |
| 6,295,512 | B1 * | 9/2001 | Bryant | .................... | G01V 3/02 324/357 |
| 6,943,553 | B2 * | 9/2005 | Zimmermann | .......... | G01V 3/06 324/357 |
| 7,386,402 | B2 * | 6/2008 | Bryant | .................... | G01V 1/22 702/182 |
| 7,788,049 | B2 * | 8/2010 | Bryant | .................... | G01V 1/22 702/57 |
| 7,813,883 | B2 * | 10/2010 | Bryant | .................... | G01V 1/22 702/57 |
| 8,019,547 | B2 * | 9/2011 | Bryant | .................... | G01V 1/22 702/7 |
| 8,274,288 | B2 * | 9/2012 | Ziolkowski | .............. | G01V 3/02 324/336 |
| 9,151,861 | B2 * | 10/2015 | LaBrecque | .............. | G01V 3/02 |
| 9,207,198 | B2 * | 12/2015 | Wang | .................. | G01N 27/026 |
| 9,638,652 | B2 * | 5/2017 | Ghods | .................... | G01N 27/04 |
| 9,772,423 | B2 * | 9/2017 | Johnson | .................... | G01V 3/02 |
| 9,952,345 | B1 * | 4/2018 | Harro | ........................ | G01V 3/02 |
| 9,995,838 | B2 * | 6/2018 | LaBrecque | .............. | G01V 3/38 |
| 10,571,418 | B2 * | 2/2020 | Ghods | .................... | G01N 27/02 |
| 10,739,289 | B2 * | 8/2020 | Ghods | .................... | G01N 27/04 |
| 10,816,494 | B2 * | 10/2020 | Cerepi | ...................... | G01V 3/24 |
| 11,016,046 | B2 * | 5/2021 | Ghods | .................... | G01N 17/02 |
| 2004/0201380 | A1 * | 10/2004 | Zimmermann | .......... | G01V 3/06 324/334 |
| 2007/0299632 | A1 * | 12/2007 | Bryant | .................... | G01V 3/02 702/188 |
| 2008/0042653 | A1 * | 2/2008 | Bryant | .................... | G01V 1/22 324/348 |
| 2008/0136421 | A1 * | 6/2008 | Bryant | .................... | G01V 1/22 324/357 |
| 2008/0221797 | A1 * | 9/2008 | Bryant | .................... | G01V 3/02 702/7 |
| 2010/0194396 | A1 * | 8/2010 | Bryant | .................... | G01V 1/22 324/357 |
| 2010/0315088 | A1 * | 12/2010 | Ziolkowski | .............. | G01V 3/02 324/354 |
| 2012/0029825 | A1 | 2/2012 | Cho et al. | | |
| 2012/0098549 | A1 * | 4/2012 | Wang | .................... | G01N 27/026 324/649 |
| 2012/0223717 | A1 * | 9/2012 | LaBrecque | .............. | G01V 3/02 324/354 |
| 2014/0210494 | A1 * | 7/2014 | Ghods | .................... | G01N 17/02 324/700 |
| 2015/0006081 | A1 * | 1/2015 | Versteeg | .................. | G01V 3/38 702/7 |
| 2016/0025885 | A1 * | 1/2016 | LaBrecque | .............. | G01V 3/38 324/354 |
| 2016/0033668 | A1 * | 2/2016 | Johnson | .................... | G01V 3/20 702/7 |
| 2017/0227481 | A1 * | 8/2017 | Ghods | .................... | G01N 17/02 |
| 2019/0242840 | A1 * | 8/2019 | Ghods | .................. | G01N 33/383 |
| 2019/0285562 | A1 * | 9/2019 | Penny | .................. | G01N 27/045 |
| 2020/0018712 | A1 * | 1/2020 | Ghods | .................. | G01N 27/026 |
| 2020/0249370 | A1 * | 8/2020 | Wang | ........................ | G01V 3/38 |
| 2021/0262962 | A1 * | 8/2021 | Ghods | .................. | G01N 33/383 |

FOREIGN PATENT DOCUMENTS

| | | | |
|---|---|---|---|
| CN | 204256187 U | 4/2015 | |
| CN | 104614771 A | 5/2015 | |
| CN | 104656145 A | 5/2015 | |
| CN | 105866842 A | 8/2016 | |
| CN | 205991957 U | 3/2017 | |
| CN | 111722292 A * | 9/2020 | |
| CN | 108614300 B * | 12/2020 | |
| EP | 3819676 A1 * | 5/2021 | ............ G01S 19/14 |
| KR | 102309633 B1 * | 10/2021 | |
| WO | WO-2010150009 A1 * | 12/2010 | ........... G01N 27/026 |
| WO | WO-2012118931 A2 * | 9/2012 | ............... G01V 3/02 |
| WO | WO-2016018492 A1 * | 2/2016 | ............... G01V 3/02 |
| WO | WO-2019200905 A1 * | 10/2019 | ............... G01V 3/38 |

OTHER PUBLICATIONS

English Translation of the Written Opinion of the International Searching Authority of PCT/CN2018/115832 (Year: 2019).*
International Search Report of PCT/CN2018/115832.

* cited by examiner

PROSPECTING METHOD AND INSTRUMENT SYSTEM OF THE THREE-DIMENSIONAL ELECTRICAL RESISTIVITY TOMOGRAPHY BASED ON RANDOM DISTRIBUTION OF ELECTRODES

CROSS-REFERENCE TO RELATED APPLICATIONS

This application is a continuation of and claims priority to International (PCT) Patent Application No. PCT/CN2018/115832, filed on Nov. 16, 2018, entitled "PROSPECTING METHOD OF THREE-DIMENSIONAL ELECTRICAL RESISTIVITY TOMOGRAPHY BASED ON RANDOM DISTRIBUTION OF ELECTRODES AND PROSPECTING SYSTEM OF THE SAME", which claims foreign priority of Chinese Patent Application No. 201810348248.5, filed Apr. 18, 2018 in the China National Intellectual Property Administration, the entire contents of which are hereby incorporated by reference in their entireties.

TECHNICAL FIELD

This disclosure relates to the technical field of electrical prospecting, and particularly relates to a three-dimensional electrical resistivity tomography method based on random distribution of electrodes and a prospecting system thereof.

BACKGROUND

The electrical resistivity tomography is an array prospecting method developed on the basis of ordinary electrical prospecting methods. In the traditional electrical resistivity tomography method, all electrodes are connected in series via cables and then attached to the instrument. Current electrodes (C1, C2) and potential electrodes (P1, P2), which meets the requirements of the device (e.g. Wenner, dipole-dipole, etc.) configuration, are selected by an internal program-controlled switch for automatic measurement. The apparent resistivity $\rho_s$ corresponding to a certain device configuration can be obtained by calculation. The instrument may obtain the apparent resistivity of a series of measurement points at different positions and depths by sequentially changing the device configuration (i.e. changing the position of the current and potential measurement points) through the program-controlled switch. At last, the post data processing (i.e. inversion) is performed to obtain the underground resistivity imaging of the survey area. The advantage of the electrical resistivity tomography is that all the electrodes only need to be arranged once, and the four needed electrodes will be selected by the programmed instrument during the measurement to achieve automatic measurement, which not only saves labour but also improves data collection efficiency.

However, the current electrical resistivity tomography have the following disadvantages.

1. Only regular grids are permitted for electrode arrangement design. In urban or complex environmental conditions, it is difficult to find regular areas suitable for the electrode arrangement. This severely limits the application of electrical resistivity tomography in the field survey.

2. Need for a long cable to connect all the electrodes in series, and the measurement is sequentially performed by the order of electrodes along the cable. Cumbersome cable not only increases labor efforts, but also makes it difficult to carry out on-site cable arrangement in the presence of obstacles (e.g. rivers, large buildings, transportation trunks, etc.).

3. The current electrical resistivity tomography for three-dimensional survey uses regular grids to arrange the points/lines. In such methods, measurement can only be proceeded in two orthogonal directions along the line. It's only a quasi-three-dimensional measurement. Moreover, only four electrodes of two electrode pairs (current/potential) selected from all electrodes in the current electrical resistivity tomography are used for each measurement, which is a main reason for low collection efficiency.

SUMMARY OF THIS INVENTION

It is an object of the present disclosure to provide electrodes based on random distribution of electrodes and a prospecting system to overcome the disadvantages of the prior art.

In one aspect, a prospecting system based on random distribution of electrodes is provided. The prospecting system comprises a central console and a plurality of data collection units. The data collection units are randomly arranged as required. The data collection unit comprises a collection station and two electrodes, having GPS positioning function, connected to collection station by a short cable. The positions of the electrodes are flexibly arranged according to the grounding condition. Each data collection unit is connected to the central console via wireless communication, and is commanded by the central console to perform the current supply or electrical potential measurement. The measurement result will be transmitted back to the central console by each of the data collection units.

In some embodiments, the central console comprises a central control computer, a wireless communication control unit. The central control computer is configured to control the data collection of all of the data collection units. The wireless communication control unit comprises a control module, a transmitter, a receiver, and a wireless transmission antenna. The wireless communication control unit is configured to establish a wireless communication with each collection station, register the collection station, issue instructions, and monitor the status of the collection station.

In some embodiments, the collection station comprises a control module, a current supply module, a built-in power module, a potential measurement module, an external boost power module, a wireless communication antenna, and two cable interfaces. The control module is configured to receive instructions from the central console, control the data collection unit to perform supply current measurement or electrical potential measurement. The collected data will be transmitted back to the central console by the control module.

The current supply module is configured to supply current to the two electrodes which are connected to the collection station.

The measurement module is configured to measure electrical potential differences between the two electrodes which are connected to the collection station, or is configured to measure the supply current through the two electrodes.

The built-in power module is configured to supply power to the collection station, and provide power to the current supply module.

The external boost power module is configured to provide supplementary power for the data collection unit according to actual needs, in order to increase the supply current and voltage.

In some embodiments, the electrodes with GPS positioning comprises an electrode and a GPS antenna. The electrode and the GPS antenna are connected to the short cable, and GPS data is transported back to the collection station via the short cable.

In some embodiments, the GPS antenna is arranged on the top of the electrode by magnetic attraction.

In another aspect, a three-dimensional electrical resistivity tomography based on random distribution of electrodes is provided. The measurement method is executed and achieved based on the above-mentioned prospecting system. The measurement method uses a parallel measurement method as follows.

Step (1), all data collection units are registered and numbered by the central console.

Step (2), after initiating the collection, a data collection unit is designated by the central console as the current supply unit according to the number, and all the rest of data collection units are used as potential measurement units for electrical potential measurement.

Step (3), after completing one measurement, a following data collection unit is designated by the central console as the current supply unit according to the number, and all the rest of data collection units are used as potential measurement units for electrical potential measurement.

Step (4), after all the data collection units have been designated as current supply unit in turn, the entire measurement process is completed.

Compared with the prior art, the present disclosure has the following beneficial effects.

1. Flexible electrode arrangement. Electrode points can be flexible arranged according to the grounding condition. Each collection station may in control of a pair of electrodes (i.e. an electrode pair). The spacing and orientation of the electrode pair can be conveniently arranged according to the actual grounding condition, and not limited to the fixed spacing or regular grids. Accordingly, a real three-dimensional measurement can be achieved.

2. Wireless communication management in the collection station. Each collection station only needs a short cable to connect the two electrodes under its control. Collection stations separately contact in wireless communication with the central console (for receiving instructions and uploading data), avoiding using long cable and eliminating the inconveniences (i.e. surface obstacles such as rivers and buildings) of using the long cable, and greatly increasing the efficiency of field arrangement.

3. Parallel work mode of the collection station. During the measurement, one collection station is responsible for current supply, and the others for electrical potential measurement at the same time. In case of N electrodes, traditional Wenner method requires (N*n−3*n*(n+1)/2 times of measurement (where, N is the total number of electrodes, n is the number of isolation layers) to complete a collection task. However, in the present disclosure, the collection station are work parallelly, so only N/2 times of measurement are needed for a collection task in a whole measurement area. This greatly increases the collection efficiency.

4. Optimized system and powerful expansion ability. The characteristics of distributed system itself determine that the system does not have high requirements on the hardware performance, and can be easily implemented. The distributed system as a whole is not only powerful, but also easy for expansion, which facilitates the development of three-dimensional prospecting. Furthermore, the collection stations are exactly the same, which is beneficial to the manufacture's mass production and also facilitates the replacement and maintenance in the collection site.

DETAILED DESCRIPTION OF THE DISCLOSURE

The present disclosure is described in detail below with reference to the accompanying drawings and preferred embodiments. The objects and effects of the present disclosure will become more apparent. The present disclosure will be further described in detail with reference to the drawings and embodiments. It should be understood that the specific embodiments described herein are only used to explain the present disclosure and are not intended to limit the scope of the present invention.

A prospecting system based on random distribution of electrodes is provided. The prospecting system comprises a central console and a plurality of data collection units. The data collection units are randomly arranged as required. The data collection unit comprises a collection station and two electrodes, having GPS positioning function, connected by a short cable. The positions of the electrodes are flexibly arranged according to the grounding condition. Each data collection unit is connected to the central console via wireless communication, and is commanded by the central console to perform the current supply measurement or electrical potential measurement. The measurement result will be transmitted back to the central console by each of the data collection units.

Figure 1:
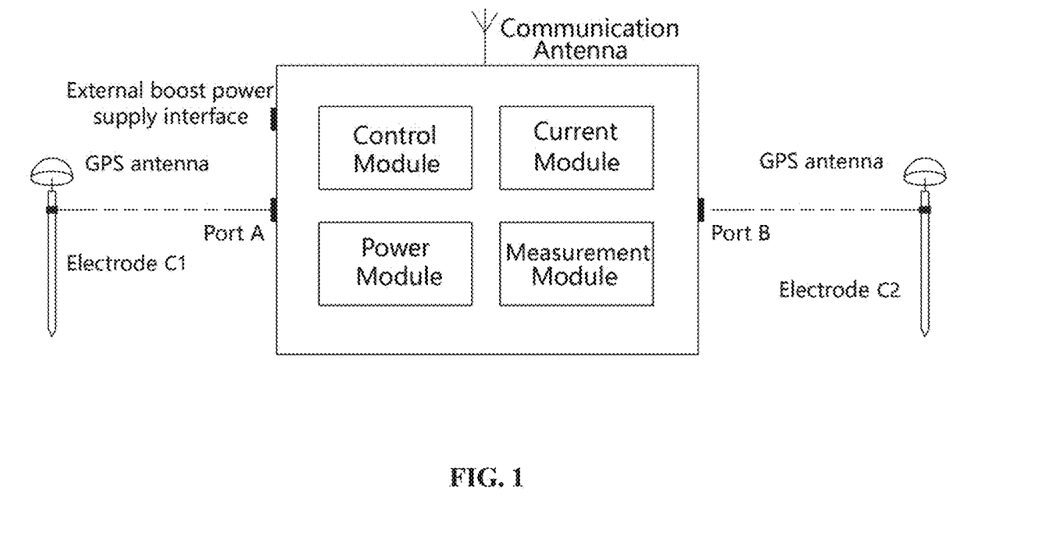
FIG. 1 is a schematic diagram of the central console according to the present disclosure.

The central console is the brain and instruction issuing center, comprising a central control computer, a wireless communication control unit. Referring to FIG. 1, the central console may further comprise varies of computer peripherals, such as a display screen, a keyboard, varies of interface or the like. Collection software may run on the central control computer. The central control computer is configured to control the data collection of all of the data collection units, including the setting of geometry parameters, the monitoring the status of all collection station, transmission of data collection instructions, data uploading, functions like display and save. The wireless communication control unit comprises a control module, a communication transmitter, a communication receiver, and a wireless transmission antenna. The wireless communication control unit is controlled by the collection software to be configured to establish a wireless communication with each collection station, register the collection station, issue instructions, and monitor the status of the collection station. The wireless communication unit uses a full-duplex work mode.

Figure 2:
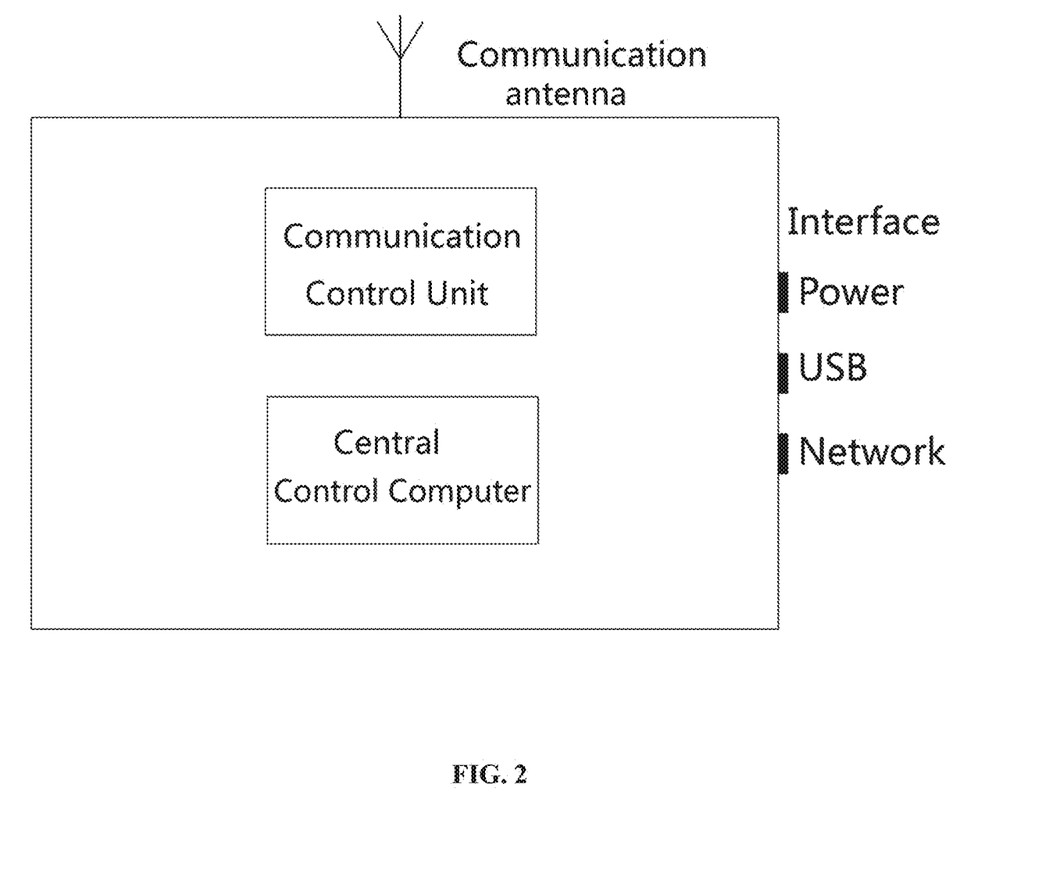
FIG. 2 is a schematic diagram of the data collection unit according to the present disclosure.

The collection station comprises a control module, a current supply module, a built-in power module, a measurement module, an external boost power module, a wireless communication antenna, and a cable interface. Referring to FIG. 2, the control module is configured to receive instructions from the central console, control the data collection unit to perform current supply measurement or electrical potential measurement. The collected data will be uploaded to the central console by the control module.

The control module is further configured to be responsible for its own operations management, self-test, measurement, and control on modules during data saving, uploading and the like.

The power supply module is configured to supply current to the two electrodes which are connected to the collection station. The current supply module may supply current to the ground via the cable when receiving a supply instruction.

The measurement module is configured to measure electrical potential differences between the two electrodes which are connected to the collection station, or is configured to measure supply current through the two electrodes.

The built-in power module is configured to supply power to the collection station, and provides power to the current supply module.

The external boost power module is configured to provide supplementary power for the data collection unit according to actual needs, in order to increase the power supply current and voltage.

The electrodes with GPS positioning function comprises an electrode and a GPS antenna. The electrode and the GPS antenna are connected to the short cable, and GPS data is transmitted back to the collection station via the short cable.

The GPS antenna is provided for obtaining the location information of the electrode. In the present embodiment, the GPS antenna is designed to be located on the top of the electrode using magnetic attraction. The GPS and the electrode share the same multi-core cable. Each collection station is equipped with 2 cables, 2 GPS antennas and 2 electrodes.

Figure 3:
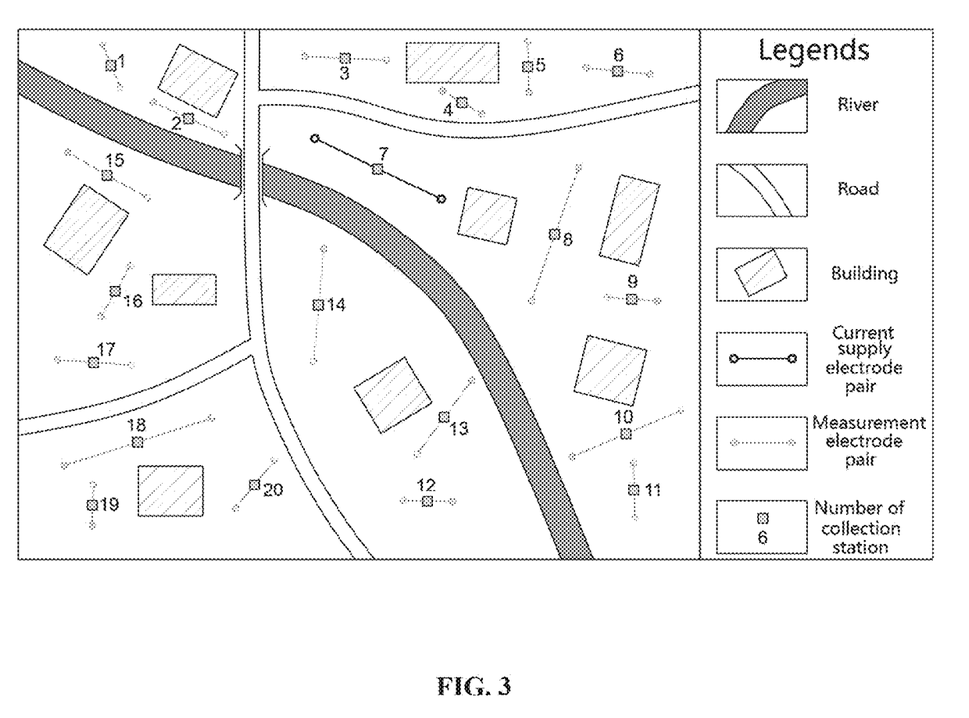
FIG. 3 is a schematic diagram of the arrangement and the collection mode of the measurement system according to the present disclosure.
Figure 4:
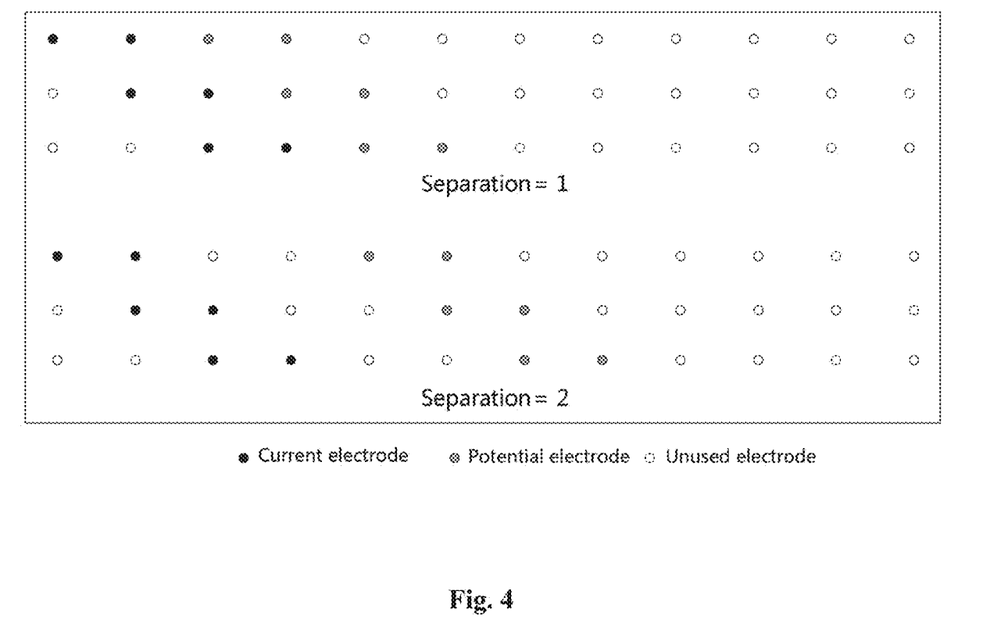
FIG. 4 is a schematic diagram of the arrangement of measurement points in ordinary dipole-dipole collection according to the prior art.
Figure 5:
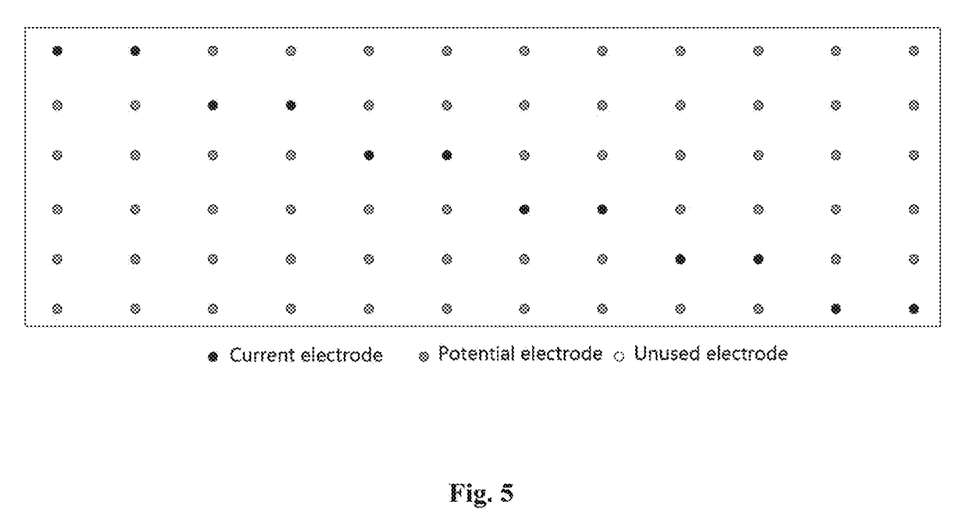
FIG. 5 is a schematic diagram of the arrangement of measurement points in parallel mode according to the present disclosure.

Compared with traditional electrical resistivity tomography method, the present disclosure uses a different collection manner, as shown in FIGS. 3-5. The traditional electrical resistivity tomography method is controlled by a program-controlled switch. Only 4 electrodes can be selected to be current supply electrodes (C1 and C2) and potential measurement electrodes (P1 and P2) at a time, and then the other electrodes are sequentially selected in the following measurement till the end. Referring to FIG. 4, in the present embodiment, one collection station is designated by the central console to provide a current supply pair (C1 and C2), while the electrodes in the rest of collection stations are configured to be potential measurement electrodes. The designated current supply electrodes and the potential measurement electrodes in this embodiment are configured to work simultaneously. Then the current supply task is moved to the next collection station, and all the other collection stations (including the collection station which is previously designated as current supply electrode). When all of the collection stations have been designated to work as current supply electrode, the measurement task on the measurement area is completed. Referring to FIG. 5, the collection method is specified to comprises the following steps.

A three-dimensional electrical resistivity tomography method based on random distribution of electrodes is provided. The measurement method is executed and achieved based on the above-mentioned prospecting system. The measurement method uses a parallel measurement method as follows.

Step (1), all data collection units are registered and numbered by the central console.

Step (2), after initiating the collection, a data collection unit is designated by the central console as the current supply unit according to the number, and all the rest of data collection units are used as potential measurement units for electrical potential measurement.

Step (3), after completing one measurement, a following data collection unit is designated by the central console as the current supply unit according to the number, and all the rest of data collection units are used as potential measurement units for electrical potential measurement.

Step (4), after all the data collection units have been designated as current supply unit in turn, the entire measurement process is completed.

Those skilled in the art can understand that the above description is only a preferred example of the disclosure and is not intended to limit the scope of the invention. Although the disclosure has been described in detail with reference to the foregoing examples, it can still be understood by those skilled in the art that the present disclosure may be modified, or equivalently replaced with some technical features. Any modification, equivalent replacement, etc. within the spirit and principle of the disclosure shall be included in the scope of protection of the invention.

What is claimed is:

1. A three-dimensional electrical resistivity tomography prospecting system based on random distribution of electrodes, wherein the prospecting system comprises a central console and a plurality of data collection units;

the data collection units are randomly arranged as required;

the data collection unit comprises a collection station and two electrodes connected by a short cable; the two electrodes comprises GPS positioning function;

each data collection unit is connected to the central console via wireless communication, and is commanded by the central console to perform current supply measurement or electrical potential measurement; a measurement result is transmitted back to the central console by each of the data collection units;

wherein the collection station comprises a control module, a current supply module, a built-in power module, a measurement module, an external boost power module, a wireless communication antenna, and cable interfaces;

the control module is configured to receive instructions from the central console, control the data collection unit to perform current supply measurement or electrical potential measurement; the collected data is transmitted back to the central console by the control module;

the current supply module is configured to supply current to the two electrodes which are connected to the collection station;

the measurement module is configured to measure electrical potential differences between the two electrodes which are connected to the collection station, or is configured to measure current supply current through the two electrodes;

the built-in power module is configured to supply power to the collection station, and provide power to the current supply module;

the external boost power module is configured to provide supplementary power for the data collection unit according to actual needs, in order to increase the power supply current and voltage.

2. The three-dimensional electrical resistivity tomography prospecting system according to claim 1, wherein the central console comprises a central control computer, a wireless communication control unit;

the central control computer is configured to control the data collection of all of the data collection units;

the wireless communication control unit comprises a control module, a transmitter, a receiver, and a wireless transmission antenna;

the wireless communication control unit is configured to establish a wireless communication with the collection station, register the collection station, issue instructions, and monitor the status of the collection station.

3. The three-dimensional electrical resistivity tomography prospecting system according to claim 1, wherein the electrodes with GPS positioning function comprises an electrode and a GPS antenna;

the electrode and the GPS antenna are connected to the short cable, and GPS data is transmitted back to the collection station via the short cable.

4. The three-dimensional electrical resistivity tomography prospecting system according to claim 3, wherein the GPS antenna is arranged on the top of the electrode by magnetic attraction.

\* \* \* \* \*